C. D. SUTTON.
Calipers.
No. 26,716. Patented Jan'y 3, 1860.
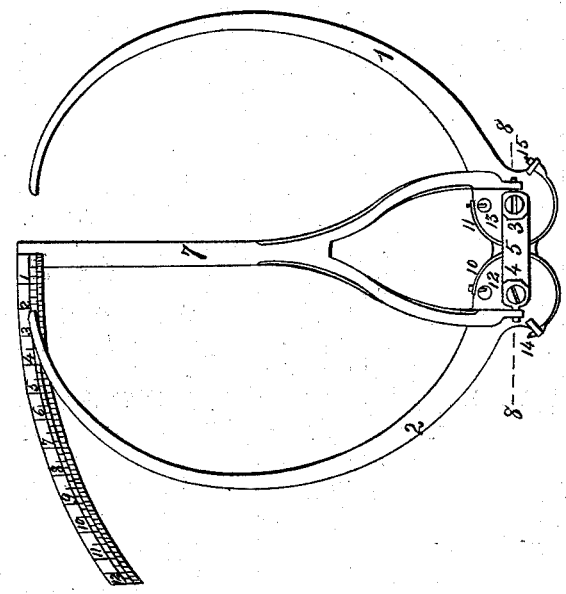
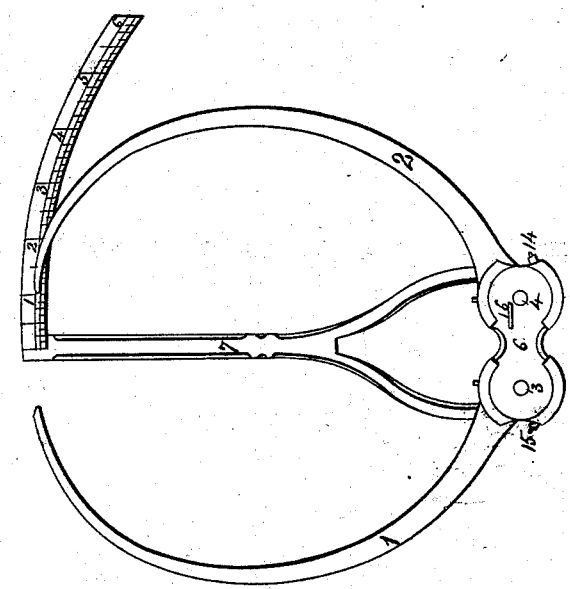
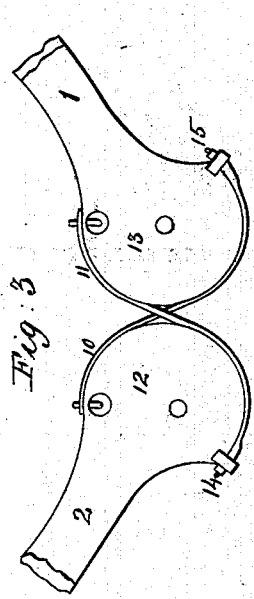
Witnesses.
E. Chichester Fisher
Oscar B Sutton
Inventor
Charles D Sutton

UNITED STATES PATENT OFFICE.

CHARLES D. SUTTON, OF KENSICO, NEW YORK.

CALIPERS.

Specification of Letters Patent No. 26,716, dated January 3, 1860.

*To all whom it may concern:*

Be it known that I, CHARLES D. SUTTON, of Kensico, in the county of Westchester and State of New York, have invented a certain Improvement in Calipers, the construction and operation of which I have described in the following specification and illustrated in its accompanying drawings with sufficient clearness to enable competent and skilful workmen in the arts to which it pertains or is most nearly allied to make and use my invention.

My said invention is intended to furnish the ready means of measuring either the radius or diameter of a round body, without the necessity of using an instrument of great length for that purpose. It is intended more especially for the use of wheelwrights in measuring wagon hubs, though it may be used advantageously for several other purposes.

The improvement consists in the attachment to the arms between which the article to be measured is embraced, of a folding arm, with a graduated scale upon it, which may be turned out of the way to allow the measurement to be taken and afterward turned back against the arms which embrace the work in taking said measurement, to indicate the diameter or radius by means of a scale; said graduated arm being secured with the commencement of measurement in a central position, and in such a manner that the arms which embrace the work must expand equally from the said indicated center, as hereinafter more fully set forth.

Figure 1 of the accompanying drawings is a plan of the instrument as it would appear when laid upon a table, the indicating arm being folded upon the others in such a manner as to indicate the radius of the article measured. Fig. 2 is a reverse view showing the other side of the instrument, representing the graduation which indicates the whole diameter. Fig. 3 is a detail view showing the arrangement of the springs for causing the arms to expand equally from the center in reference to the central arm. Fig. 4 is also a detail view transverse to Fig. 3. It presents the edge of the parts toward the observer.

The arms 1 and 2 are made curved as shown, and are hung upon axes 3 and 4, to bars 5 and 6, which form a connecting link between these axes. The arm 7 is attached to the bar 5, by axes 8, 8, upon which it is allowed to vibrate. This arm 7, has an arc 9, upon it, which is graduated upon both sides—on one side it is graduated in inches and parts of an inch to enable the operator to read off the radius by folding the arc down upon the arms after the instrument is set to the size of the article to be measured, the other side being graduated to half the size of the same scale, so that the diameter may be read from it without the trouble of calculation.

The arms 1 and 2 are connected by two light springs 10 and 11, which are attached to the hubs 12 and 13, which form the roots of these arms. These hubs are cylindrical upon the outside, so far as they come in contact with the springs, this circular portion being concentric with the axes 3 and 4, upon which the arms are hung to the bars or connecting links 5 and 6. These springs or straps 10 and 11, are each connected at one end to one of these hubs, and at the other end to the other, crossing each other between the hubs as shown. They are drawn up to a perfect tension, by means of the screws 14 and 15, which screws also furnish the means of adjustment to bring the arms 1 and 2, to centralize exactly at the commencement of the graduation upon the arc 9. It is obvious that with this arrangement, neither of the arms 1 and 2, can vibrate upon its axis without vibrating the other an equal distance, for in moving in either direction it must wind on a portion of one of the straps or springs 10 and 11, and it cannot do this without at the same time unwinding it from the hub of the other arm, which, of course causes that arm to vibrate an equal distance.

In using these calipers, the arm 7, is first turned out of the way to give an opportunity to apply the instrument in taking the measurement of the article. The arms 1 and 2, having been adjusted in the usual manner to the size of the article, are then secured in position by the set screw 16, and on removing the instrument, the radius may be read off by holding the graduated arc over upon one of the arms as represented in Fig. 1. It is obvious that by adjusting the straps 10, and 11, the instrument may be made to indicate a size which will give a certain amount of play between the parts which are to work together, and this adjustment may be varied to suit the varied circumstances of the particular kinds of work in which it may be employed. For the convenience of transportation, the arc may be secured under the indicating arm as shown in Fig. 2. When folded into this position, the parts occupy very little room.

Having thus fully described my said invention, I claim—

The combination of the arms 1, and 2, with the springs 11, and 10, and the folding arm 7, substantially as, and for the purposes set forth.

CHARLES D. SUTTON.

Witnesses:
 E. CHICHESTER FISHER,
 OSCAR B. SUTTON.